(12) United States Patent
Bi et al.

(10) Patent No.: US 11,783,856 B2
(45) Date of Patent: Oct. 10, 2023

(54) ADAPTABLE SERVO CONTROLLERS

(71) Applicant: Seagate Technology LLC, Fremont, CA (US)

(72) Inventors: Qiang Bi, Singapore (SG); Jin Quan Shen, Singapore (SG); Xiong Liu, Singapore (SG); Xiang Lu, Singapore (SG); Hui Wang, Singapore (SG)

(73) Assignee: Seagate Technology LLC, Fremont, CA (US)

(*) Notice: Subject to any disclaimer, the term of this patent is extended or adjusted under 35 U.S.C. 154(b) by 148 days.

(21) Appl. No.: 16/875,303

(22) Filed: May 15, 2020

(65) Prior Publication Data

US 2021/0358519 A1 Nov. 18, 2021

(51) Int. Cl.
*G11B 5/55* (2006.01)
(52) U.S. Cl.
CPC .................... *G11B 5/5582* (2013.01)
(58) Field of Classification Search
CPC ........................................................ G11B 5/596
See application file for complete search history.

(56) References Cited

U.S. PATENT DOCUMENTS

| | | | | |
|---|---|---|---|---|
| 5,949,605 A * | 9/1999 | Lee | ............ | G11B 5/59627 360/77.04 |
| 6,219,814 B1 | 4/2001 | Coker et al. | | |
| 6,437,936 B1 * | 8/2002 | Chen | ............ | G11B 5/59627 360/77.04 |
| 6,550,021 B1 * | 4/2003 | Dalphy | ............ | G06F 11/2294 714/11 |
| 6,580,579 B1 * | 6/2003 | Hsin | ............ | G11B 5/5582 360/77.02 |
| 6,650,499 B1 * | 11/2003 | Kusumoto | ......... | G11B 5/59627 360/77.04 |
| 6,684,114 B1 * | 1/2004 | Erickson | ............ | G05B 5/01 360/77.04 |
| 6,751,046 B1 * | 6/2004 | Szita | ............ | G11B 5/59627 360/77.04 |
| 7,265,931 B2 * | 9/2007 | Ehrlich | ............ | G11B 5/59627 360/77.02 |
| 7,319,570 B2 * | 1/2008 | Jia | ............ | G11B 5/5582 360/77.02 |
| 7,460,329 B2 | 12/2008 | Sosseh et al. | | |
| 7,543,117 B1 * | 6/2009 | Hanan | ............ | G11B 20/00326 711/154 |
| 7,633,704 B2 | 12/2009 | Supino et al. | | |
| 7,760,461 B1 * | 7/2010 | Bennett | ............ | G11B 5/5552 360/75 |
| 7,982,999 B2 * | 7/2011 | Koizumi | ............ | G11B 19/02 360/69 |

(Continued)

OTHER PUBLICATIONS blog.fpmrphy.com, Nov. 2, 2010, disk drive metadata (Year: 2010).*

*Primary Examiner* — K. Wong
(74) *Attorney, Agent, or Firm* — Faegre Drinker Biddle & Reath LLP

(57) ABSTRACT

A device includes a servo controller that includes or that is coupled to memory. The memory stores multiple distinct disturbance control schemes. The servo controller is configured to select and implement one of the disturbance control schemes in response to receiving a command from a host. The servo controller can be implemented on a system on a chip.

20 Claims, 4 Drawing Sheets

(56) References Cited

U.S. PATENT DOCUMENTS

| | | | | |
|---|---|---|---|---|
| 8,077,420 B2 * | 12/2011 | Tanner | ............... | G11B 5/5582 |
| | | | | 360/71 |
| 8,332,695 B2 * | 12/2012 | Dalphy | ............... | G11B 27/36 |
| | | | | 714/718 |
| 8,489,841 B1 * | 7/2013 | Strecke | ............ | G06F 12/0646 |
| | | | | 711/170 |
| 9,460,744 B1 | 10/2016 | Gaub et al. | | |
| 9,536,553 B1 | 1/2017 | Seo et al. | | |
| 9,741,391 B1 | 8/2017 | Jin et al. | | |
| 9,928,862 B1 | 3/2018 | Park et al. | | |
| 9,933,769 B2 | 4/2018 | Xing et al. | | |
| 10,002,630 B1 | 6/2018 | Vu et al. | | |
| 10,296,232 B2 * | 5/2019 | Dunn | ................. | G06F 3/061 |
| 11,086,719 B2 * | 8/2021 | Hassan | ............... | G11C 16/26 |
| 2003/0041281 A1 * | 2/2003 | Nestor | .............. | G06F 11/1402 |
| | | | | 710/1 |

* cited by examiner

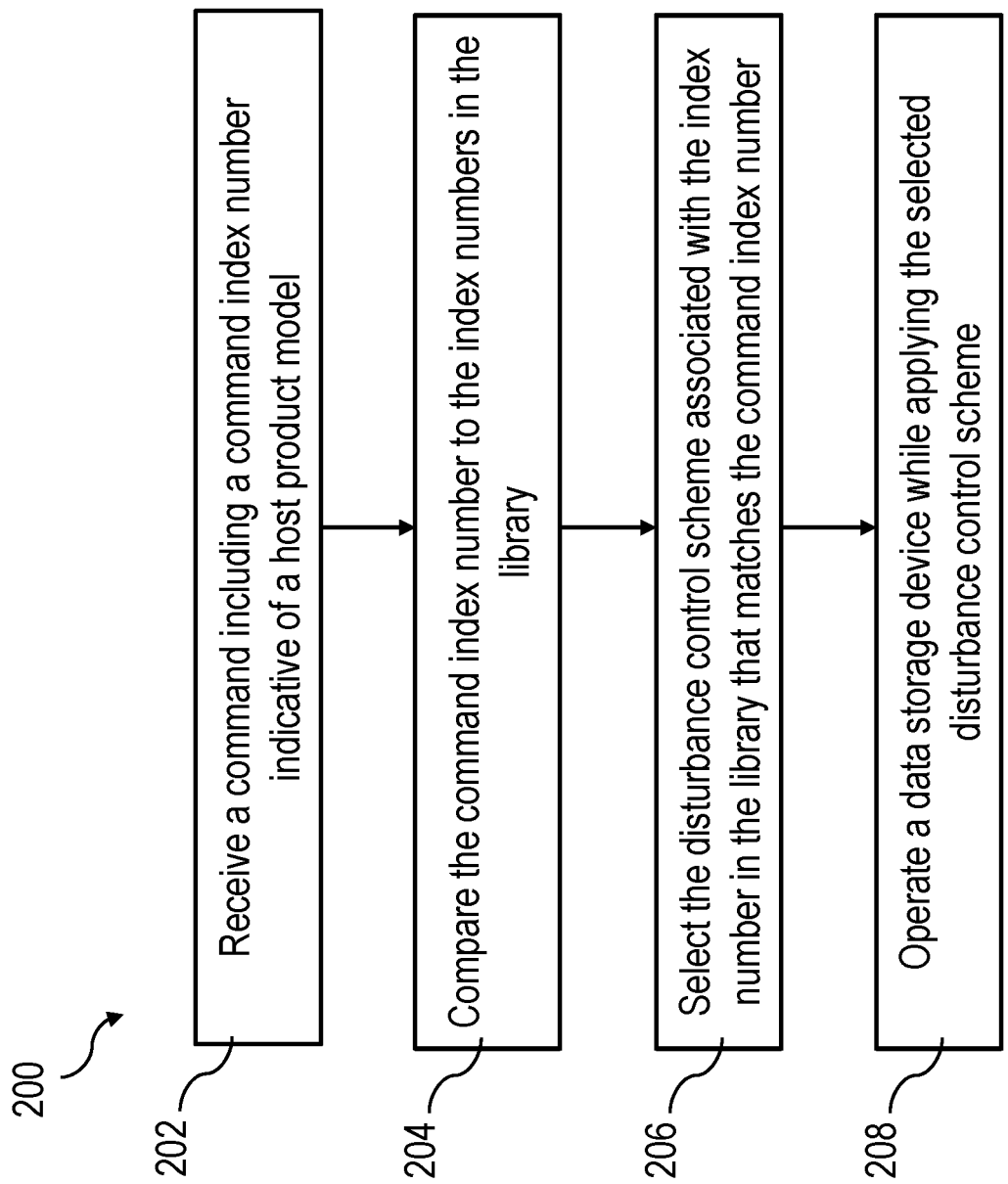

ADAPTABLE SERVO CONTROLLERS

SUMMARY

In certain embodiments, a device includes a servo controller that includes or that is coupled to memory. The memory stores multiple distinct disturbance control schemes. The servo controller is configured to select and implement one of the disturbance control schemes in response to receiving a command from a host.

In certain embodiments, system on a chip includes a servo controller including a servo microprocessor and memory. The memory stores multiple distinct disturbance control schemes. The servo microprocessor is configured to select and implement one of the disturbance control schemes in response to receiving a command from a host.

In certain embodiments, a method for selecting disturbance control schemes is disclosed. The disturbance control schemes are stored in a memory and catalogued by index number in a library associating each disturbance control scheme with one or more product models. The method includes: receiving, by a controller in communication with the memory, a command including a command index number indicative of a host product model; comparing the command index number to the index numbers in the library; selecting the disturbance control scheme associated with the index number in the library that matches the command index number; and operating a data storage device while applying the selected disturbance control scheme.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 4 shows a block diagram of steps of a method, in accordance with certain embodiments of the present disclosure.

Figure 1:
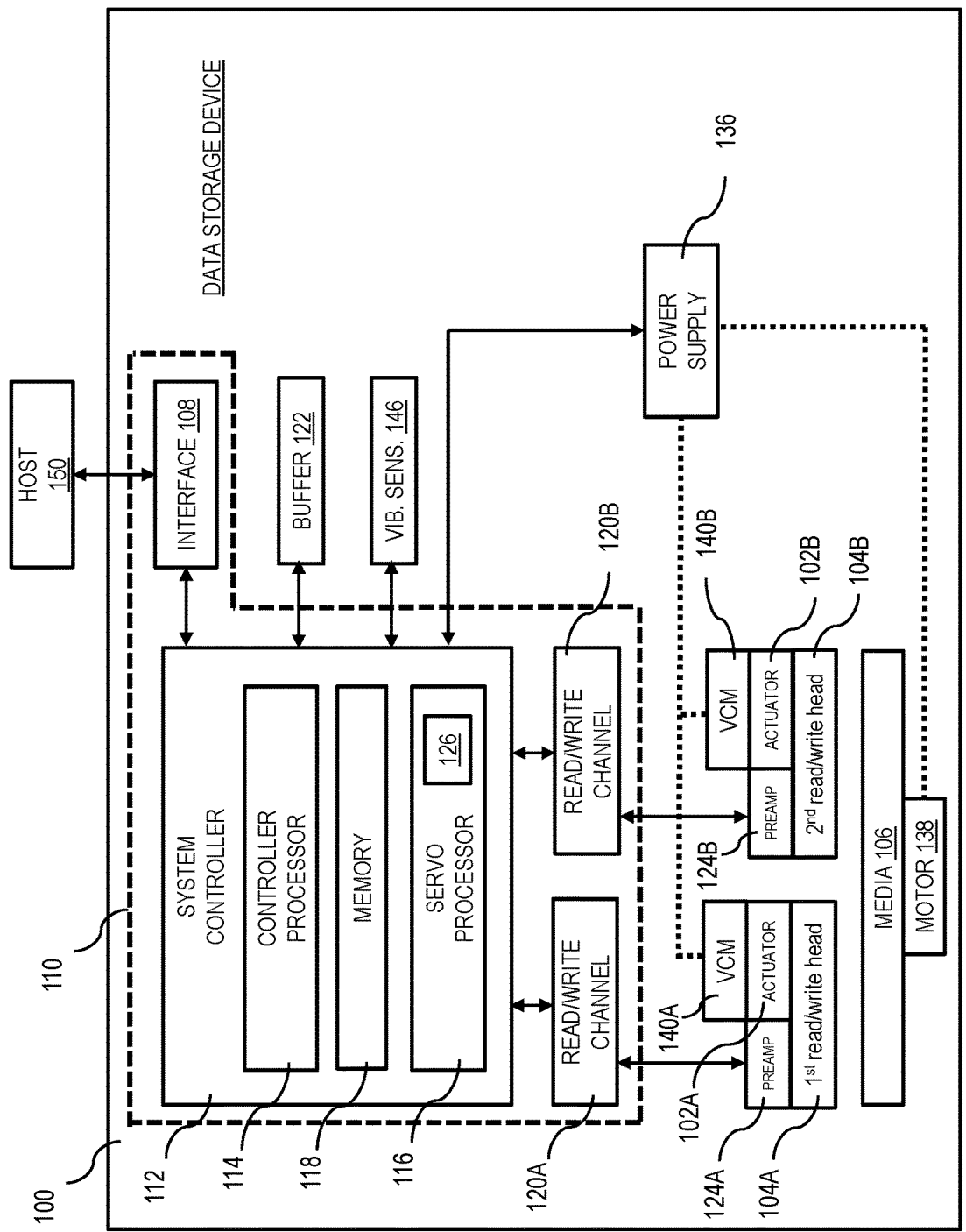
FIG. 1 shows a block diagram of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives use control systems to position actuators so that read/write heads coupled to the actuators and microactuators are positioned above desired tracks for carrying out reading and writing operations. For example, control systems may manage the amount of current supplied from a power supply to voice coil motor (VCM) assemblies to position the actuators and microactuators. The power supply may alter an amount of current to the VCM assemblies such that disturbances (e.g., vibration) are compensated for. Left uncompensated, disturbances may alter the ability of the VCM assemblies to accurately position the actuators. To compensate for disturbances, the control systems may include a disturbance control scheme that adjusts the amount of current supplied to the VCM assemblies in response to detected disturbances. However, devices in different environments will be subjected to disturbances with different characteristics such as vibration modes with various characteristics (e.g., frequency ranges, magnitudes, and mode shapes). As such, a disturbance control scheme that performs well in one environment may not perform as well in other environments. And, although a single disturbance control scheme may be dynamic, its ability to adapt is limited across wide variations in vibration modes. Certain embodiments of the present disclosure are accordingly directed to methods and devices with capabilities to utilize multiple disturbance control schemes.

FIG. 1 shows a schematic of a data storage device 100 such as a hard disk drive. Although the type of device described below is a data storage device 100, the approaches described herein can apply to other types of devices that would benefit from utilizing a control system that can adapt or otherwise incorporate multiple different disturbance control schemes.

In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator.

The data storage device 100 includes an interface 108 (e.g., an input/output interface) for transferring data to and from the data storage device 100. For example, the interface 108, among other features, can be communicatively coupled between a host 150 (e.g., a laptop or a data storage system such as a server) and the read/write heads 104A and 104B to facilitate communication, using a standardized communication protocol (e.g., SATA, SAS, SCSI), between the read/write heads 104A and 104B and the host 150.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller 142 shown in FIG. 3). The interface 108 may also be part of the SOC 110.

The SOC 110 can also include one or more read/write channels 120A and 120B, which encode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 150. Data associated with a write command may be received from the host 150 by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 102B. Data associated with a read command may be retrieved from the magnetic recording media 106 and stored in the buffer 122. Such data is then transferred to the host 150 by the interface 108. In certain embodiments, the servo processor 116 controls operations of respective pre-amplifiers 124A and 124B, which provide signals to the respective read/write heads 104A and 104B for writing magnetic transitions to the magnetic recording media 106 and for receiving signals from the respective read/write heads 104A and 104B in response to detecting magnetic transitions written to the magnetic recording media 106.

Figure 2:
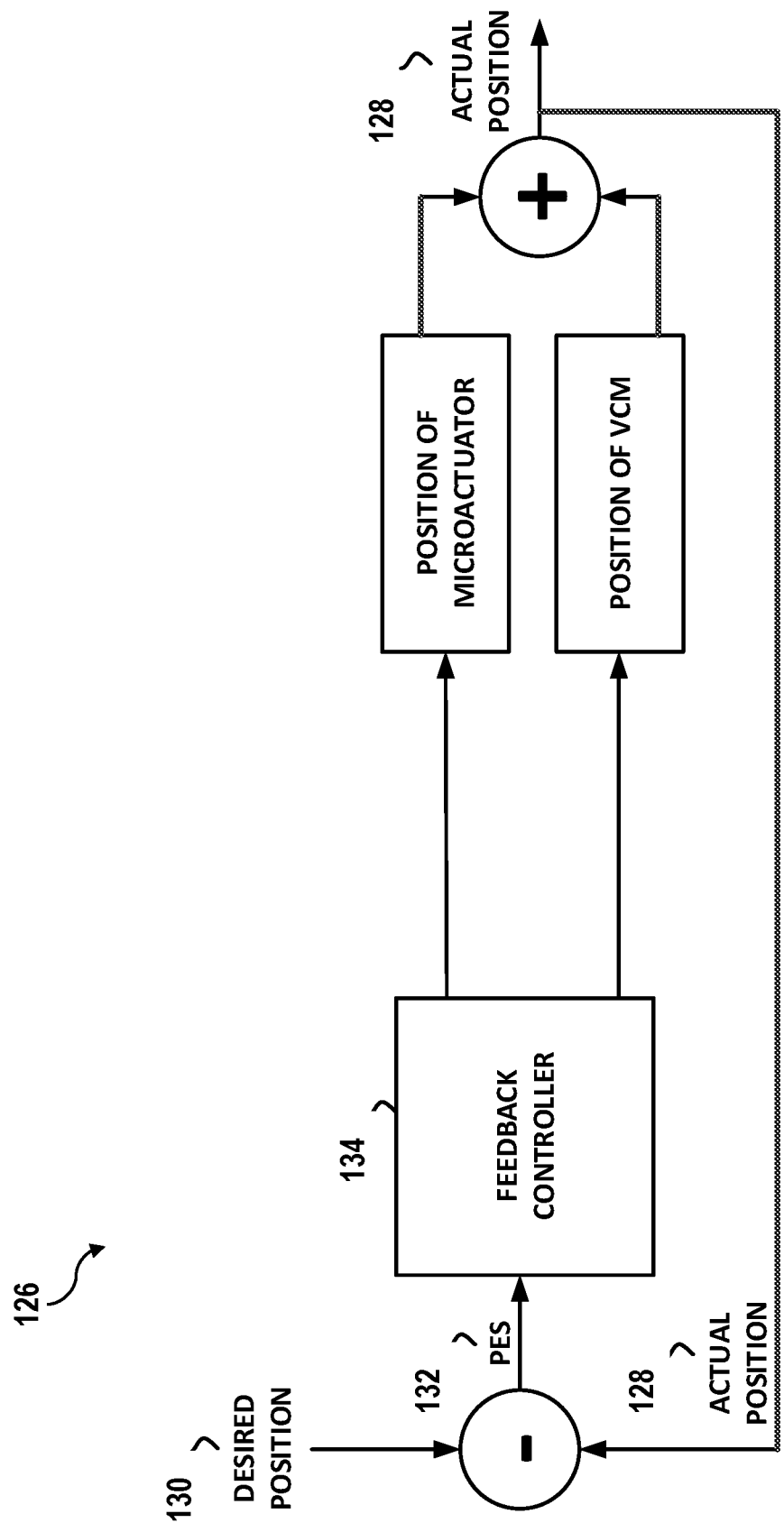
FIG. 2 shows a diagram of a servo control system, in accordance with certain embodiments of the present disclosure.

The data storage device 100 includes a servo control system 126 (schematically shown FIG. 2) that is carried out by components of the system controller 112 (e.g., the servo processor 116 and one or more banks of the memory 118). In operation, the read/write heads 104A and 104B read the positioning data from servo sectors stored on the magnetic recording media 106. The read positioning data is processed to determine an actual position 128 (shown in FIG. 2) of the read/write heads 104A and 104B relative to tracks on the magnetic recording media 106. The actual position 128 of the read/write heads 104A and 104B is subtracted from a desired position 130 of the read/write heads 104A and 104B to determine a position error signal (PES) 132, which is the difference between where the read/write heads 104A and 104B are and should be positioned. The PES 132 is fed into a feedback controller 134, which controls current to at least one of the VCM assemblies 140A, 140B and—for some operations—controls voltage to microactuators to position the read/write heads 104A and 104B over the desired track.

As shown in FIG. 1, the data storage device 100 includes a power supply 136, (e.g., an amplifier) which is controlled by the system controller 112. The power supply 136 supplies current to a motor 138 (e.g., spindle motor), which rotates the magnetic recording media 106. The power supply 136 also supplies current to VCM assemblies 140A and 140B. In certain embodiments, the power supply 136 is an integrated circuit, which includes electronics (e.g., voice coil driver electronics) designed to provide current to the VCM assemblies 140A and 140B.

The VCM assemblies 140A and 140B are used to position (e.g., rotate) the actuators 102A and 102B to position the read/write heads 104A and 104B over a desired data track on the magnetic recording media 106 for data reading and data writing operations. For example, in response to a command to read data from or write data to a data track located a certain distance away from where a respective read/write head 104A or 104B is currently positioned (i.e., a track-seeking operation), a current may be supplied by the power supply 136 and applied to the voice coil of the respective VCM assemblies 140A and 140B to rotate the respective actuators 102A and 102B (and therefore the respective read/write heads 104A and 104B) towards the desired data track. The applied current through the coil generates a magnetic field that interacts with magnets of the VCM assemblies 140A and 140B. The applied current may follow a current profile determined by and commanded by the servo processor 116. As the respective read/write heads 104A and 104B near the desired data track, less current is applied to the VCM assemblies 140A and 140B such that the read/write heads 104A and 104B begin to settle over the desired data track (i.e., a track-settling operation). Once the respective read/write heads 104A and 104B are positioned over the desired data track, the servo control system 126 compensates for small positioning errors (i.e., a track-follow operation) to keep the desired read/write heads 104A and 104B over the desired data tracks on the magnetic recording medium 106 during a read operation or a write operation.

As mentioned above, during operation, the servo processor 116 may utilize a disturbance control scheme that helps compensate for disturbances as one or more of the read/write heads 104A and 104B are positioned over the desired data track. Also mentioned above is that—when positioned in different environments—devices such as the data storage device 100 will be subjected to vibration modes with different characteristics such as exciting frequency ranges, magnitudes, mode frequencies, and mode shapes. As such, a given disturbance control scheme may not perform equally well in all environments.

Figure 3:
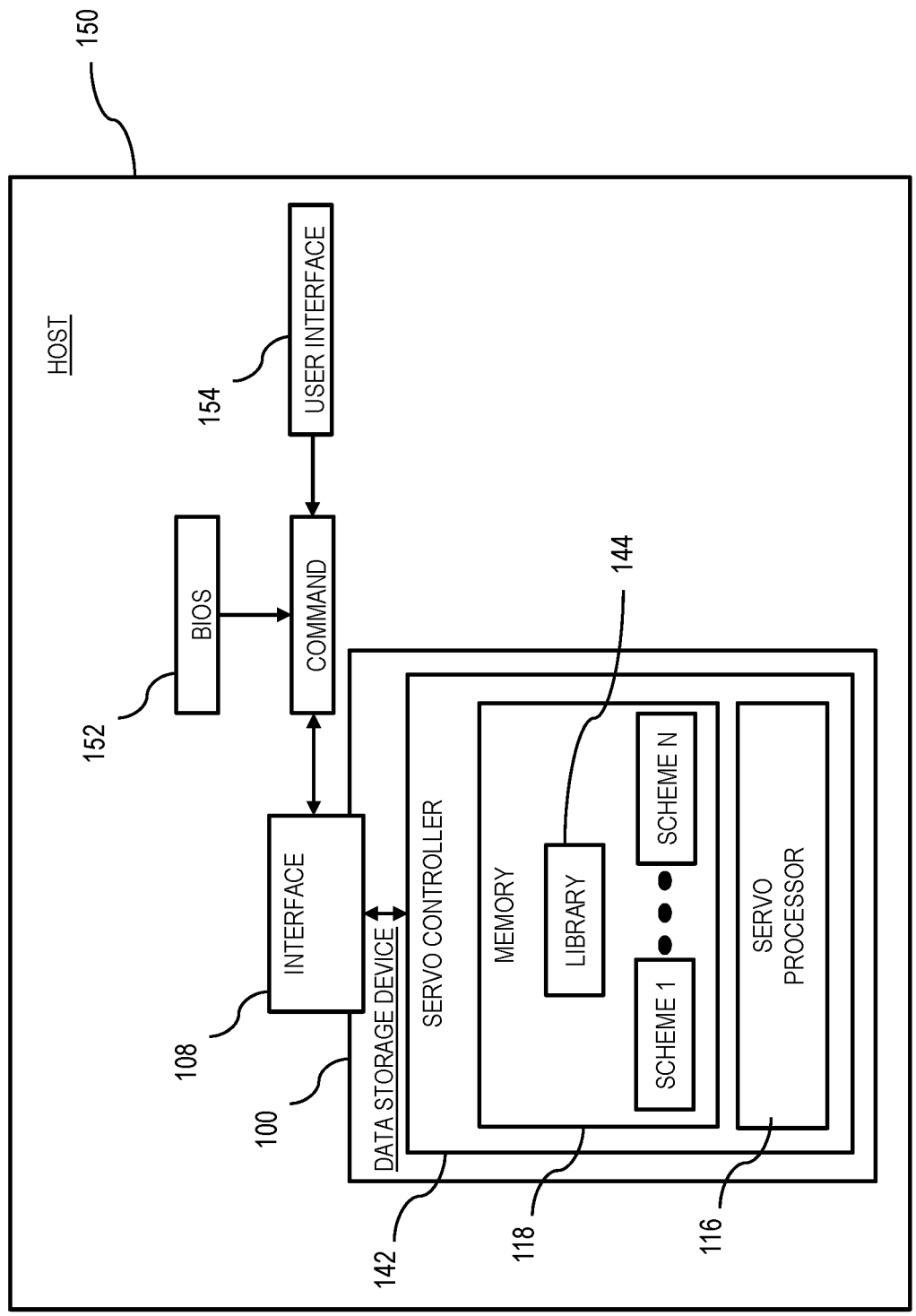
FIG. 3 shows a block diagram of the data storage device of FIG. 1 and a host system, in accordance with certain embodiments of the present disclosure.

FIG. 3 shows the host 150 with the data storage device 100 positioned within the host 150. Although only one data storage device 100 is shown in FIG. 3, the host 150 can include scores or even hundreds of individual data storage devices 100. The data storage device 100 includes the servo controller 142, which includes the servo processor 116 and the memory 118. The memory 118 stores a library 144 or database listing multiple disturbance control schemes (e.g., the computer code of the disturbance control schemes). As will be described in more detail below, the data storage device 100 can select a particular disturbance control scheme based on one or more current or intended environments.

In certain embodiments, the different environments include different enclosures in data storage systems (e.g., servers). Data storage devices positioned in different enclosures will be subjected to different disturbance characteristics. For example, enclosures from different manufacturers may have different mechanical structures, different mountings, different fan designs, and different air ventilation systems. Together, these differences can create significant variations in operating conditions with respect to disturbances. For example, some enclosures may have vibration with excitation frequencies that are more pronounced at lower frequencies (e.g., ~2 to 3 kHz) while other enclosures have excitation frequencies that are more pronounced at relatively higher frequencies (e.g., ~5-8 kHz). Further, disturbances caused by fans have different characteristics (e.g., narrower frequency bands) than disturbances caused by vibration through an enclosure's structural features (e.g., wider frequency bands).

It is challenging for a single disturbance control scheme to successfully adapt to and perform well in such wide varying environments. As such, some disturbance control schemes will perform better in certain environments than others. Performance of a given disturbance control scheme can include not only the ability to compensate for disturbances but also the ability to do so efficiently using the servo processor 116 (e.g., reducing the required number of calculations per second).

In certain embodiments, the disturbance control schemes stored in the memory 118 include two or more of the following: a rotational vibration sensor feedforward scheme, a frequency adaptive disturbance attenuation scheme, a loop shaping disturbance scheme, and/or an adaptive control scheme. Further, the memory 118 can store multiple versions of each type of disturbance control scheme. For example, the memory 118 may include one rotational vibration sensor feedforward scheme and one loop shaping disturbance scheme.

Each of the disturbance control schemes can be stored in the memory 118. In certain embodiments, all of the disturbance control schemes are stored in a single binary file (e.g., "bin" file) in the memory 118. In addition to storing the separate sets of computer code itself of the disturbance control schemes, the memory 118 can store the library 144 of the disturbance control schemes and their associations with various pre-determined environments (e.g., different types of host systems).

Rotational vibration sensor feedforward schemes use sensor signals from one or more rotational vibration sensors 146 (shown in FIG. 1) to help compensate for disturbances detected by the rotational vibration sensors 146. These rotational vibration sensor feedforward schemes are more adept at compensating for lower frequency disturbances. Example implementations are described in U.S. Pat. Nos. 6,580,579 and 7,460,329, which are herein incorporated by reference.

Frequency adaptive disturbance attenuation schemes detect disturbance frequencies and apply different filters to help compensate for the detected disturbance frequencies. These frequency adaptive disturbance attenuation schemes are more adept at compensating for narrow-band disturbances. Example implementations are described in U.S. Pat. No. 10,002,630, which is herein incorporated by reference.

Loop shaping disturbance schemes involve applying control parameters that provide a loop transfer function with a desired shape. These loop shaping disturbance schemes require less processing power (e.g., calculations per second) but do not adapt with different disturbance characteristics. As such, the memory 118 can store multiple variations of loop shaping disturbance schemes that are designed to compensate for different disturbance characteristics. Example implementations are described in U.S. Pat. Nos. 9,536,553 and 9,928,862, which are herein incorporated by reference.

Adaptive control schemes can compensate for disturbances across a larger frequency area. Example implementations are described in U.S. Pat. Nos. 9,460,744 and 9,933,769, which are herein incorporated by reference.

One of the disturbance control schemes stored in the memory 118 can be selected and implemented by the servo controller 142 for use during operation of the data storage device 100. For example, one of the disturbance control schemes can be selected based on a manufacturer of an enclosure the data storage device 100 is installed or will be installed. As another example, one of the disturbance control schemes can be selected based on a specific product model of the enclosure the data storage device 100 is installed or will be installed. As another example, one of the disturbance control schemes can be selected based on disturbance characteristics (e.g., magnitude and/or a frequency peak) of the enclosure the data storage device 100 is installed or will be installed.

As another example, one of the disturbance control schemes can be selected based on a position within an enclosure that the data storage device 100 is positioned or will be positioned. In this example, data storage devices positioned closest to fans in the enclosure may experience greater narrow-band disturbances than other data storage devices in the enclosure. As such, a frequency adaptive disturbance attenuation scheme may be selected for data storage devices positioned closest to the fans and another disturbance compensation scheme can be used for the other data storage devices in the enclosure.

The particular disturbance control scheme can be selected at different stages or points in time. For example, the disturbance control scheme can be selected while the data storage device 100 is being tested and certified in the factory. In this example, performance of the disturbance control scheme can be tested before the data storage device 100 is shipped to a customer. As another example, the disturbance control scheme can be selected while the enclosure is being configured by the customer.

As another example, the disturbance control scheme can be selected when the data storage device 100 is initially powered on. In this example, when the data storage device 100 is powered on, the electronics of the enclosure (e.g., the host 150) can send a command to the data storage device 100 indicating the manufacturer and/or model information. In response to the command indicating the manufacturer and/or model information, the data storage device 100 can select one of the disturbance control schemes stored in the memory 118.

In certain embodiments, the host 150 automatically generates the command when the data storage device 100 is initially powered on. For example, a BIOS 152 of the host 150 can include functionality for sending the manufacturer and/or model information to the data storage device 100. In other embodiments, the host 150 includes software that allows an operator to enter information about the manufacturer and/or model of the host 150 via a user interface 154 when the host 150 initially powers on the data storage device 100.

The command itself can take several different forms. In certain embodiments, the command initiates a smart sub-command for the data storage device 100. This approach can be used when the interface 108 is a SATA interface. In other embodiments, the command is a new write log page command for the data storage device 100. This approach can be used when the interface 108 is a SAS interface. In other embodiments, when the interface 108 is a SCSI interface, the host 150 sends SCSI command extensions to the data storage device 100. Of course, the command can take other forms depending on the type of the interface 108 of the data storage device 100.

When the command is received, the data storage device 100 can initiate an internal command to write a data block with information indicative of the manufacturer and/or model. For example, the data block can be a 4 KB data block that comprises a data structure with an index number that is associate with a particular manufacturer and/or model.

In response to the information (e.g., index number) indicative of the manufacturer and/or model in the data block, the data storage device 100 can search for matches in the library 144 of disturbance control schemes stored in the memory 118. If the manufacturer and/or model information in the data block matches information in the library 144, the servo controller 142 can select the disturbance control scheme pre-associated with the manufacturer and/or model information in the library 144. If no matches are found, the servo controller 142 can select and implement a default disturbance control scheme. Once one of the disturbance control schemes is selected, the servo controller 142 can apply the selected disturbance control scheme during operation of the data storage device 100. In certain embodiments, if the data storage device 100 is later repurposed or otherwise used in a different environment, a different disturbance compensation scheme can be selected and implemented by the data storage device 100.

Although the various approaches were primarily described above in the context of the host 150 being a data storage system such as a server with one or more enclosures, the approaches can be applied in other host environments. For example, the approaches can be used when the host 150 is a network attached storage (NAS) system or a surveillance system.

FIG. 4 outlines a method 200 for selecting a disturbance control scheme for use in a data storage device. The method 200 includes receiving a command including a command index number indicative of a host product model (block 202 in FIG. 4). The method 200 further includes comparing the command index number to the index numbers in the library (block 204 in FIG. 4). The method 200 further includes selecting the disturbance control scheme associated with the index number in the library that matches the command index number (block 206 in FIG. 4). The method 200 further includes operating a data storage device while applying the selected disturbance control scheme (block 208 in FIG. 4).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A device comprising:
a servo controller including or coupled to memory, which stores multiple distinct disturbance control schemes, wherein the servo controller is configured to select and implement one of the disturbance control schemes in response to receiving a command from a host.

2. The device of claim 1, wherein the disturbance control scheme is selected based on a specific manufacturer.

3. The device of claim 1, wherein the disturbance control scheme is selected based on a specific product model.

4. The device of claim 1, wherein the disturbance control scheme is selected based on disturbance characteristics.

5. The device of claim 4, wherein the disturbance characteristics include a magnitude and/or a frequency peak.

6. The device of claim 1, wherein the disturbance control scheme is selected when the device is initially powered-on.

7. The device of claim 1, wherein the disturbance control scheme is selected based on a position within an enclosure.

8. The device of claim 1, wherein the disturbance control schemes include at least two of the following: a rotational vibration sensor feedforward scheme, a frequency adaptive disturbance attenuation scheme, a loop shaping disturbance scheme, and an adaptive control scheme.

9. The device of claim 1, wherein the disturbance control schemes include a rotational vibration sensor feedforward scheme, a frequency adaptive disturbance attenuation scheme, a loop shaping disturbance scheme, and an adaptive control scheme.

10. The device of claim 1, wherein the disturbance control schemes are stored within a single binary file in the memory.

11. The device of claim 1, wherein the disturbance control schemes are separate sets of computer code.

12. The device of claim 1, further comprising:
a voice coil motor (VCM) assembly; and
a power supply electrically coupled to the VCM assembly to direct current to the VCM assembly, wherein the selected disturbance control scheme affects an amount of current directed to the VCM assembly.

13. The device of claim 1, wherein the memory stores a library that indexes and associates product models with the disturbance control schemes.

14. The device of claim 1, wherein the command includes an index number, wherein the servo controller is configured to select one of the disturbance control schemes based on the index number.

15. A system on a chip (SOC) comprising:
a servo controller including a servo microprocessor and memory,
the memory storing multiple distinct disturbance control schemes,
the servo microprocessor configured to select and implement one of the disturbance control schemes in response to receiving a command from a host.

16. The SOC of claim 15, wherein the disturbance control schemes are stored within a single binary file in the memory.

17. The SOC of claim 15, wherein the disturbance control schemes are separate sets of computer code.

18. The SOC of claim 15, wherein the disturbance control schemes include at least two of the following: a rotational vibration sensor feedforward scheme, a frequency adaptive disturbance attenuation scheme, a loop shaping disturbance scheme, and an adaptive control scheme.

19. The SOC of claim 15, wherein the memory stores a library that catalogues associated product models and the disturbance control schemes by index numbers, wherein the servo microprocessor is configured to select one of the disturbance control schemes based on comparing the index numbers in the library to an index number in the command.

20. A method for selecting disturbance control schemes stored in a memory and catalogued by index number in a library associating each disturbance control scheme with one or more product models, the method comprising:

receiving, by a controller in communication with the memory, a command including a command index number indicative of a host product model;
comparing the command index number to the index numbers in the library;
selecting the disturbance control scheme associated with the index number in the library that matches the command index number; and
operating a data storage device while applying the selected disturbance control scheme.

* * * * *